United States Patent
Zhang

(10) Patent No.: US 8,356,299 B2
(45) Date of Patent: Jan. 15, 2013

(54) INTERRUPT PROCESSING METHOD AND SYSTEM

(75) Inventor: Dongdong Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1237 days.

(21) Appl. No.: 12/163,390

(22) Filed: Jun. 27, 2008

(65) Prior Publication Data

US 2009/0007110 A1 Jan. 1, 2009

(30) Foreign Application Priority Data

Jun. 29, 2007 (CN) .......................... 2007 1 0118191

(51) Int. Cl.
*G06F 9/455* (2006.01)
*G06F 9/46* (2006.01)
*G06F 12/00* (2006.01)
*G06F 13/00* (2006.01)
*G06F 13/28* (2006.01)
*G06F 13/24* (2006.01)

(52) U.S. Cl. ............ 718/1; 718/100; 718/101; 710/260; 710/263; 711/100

(58) Field of Classification Search ........................ None
See application file for complete search history.

(56) References Cited

U.S. PATENT DOCUMENTS

| 7,249,206 B2 * | 7/2007 | Bilak et al. ...................... 710/52 |
| 2004/0037224 A1 * | 2/2004 | Choi et al. .................... 370/235 |
| 2006/0047891 A1 * | 3/2006 | James et al. .................. 711/105 |
| 2008/0244725 A1 * | 10/2008 | Dewan et al. .................. 726/13 |

\* cited by examiner

*Primary Examiner* — Emerson Puente
*Assistant Examiner* — Jonathan R Labud
(74) *Attorney, Agent, or Firm* — Osha Liang LLP

(57) ABSTRACT

A method for interrupt processing includes setting a buffer for buffering data packets received by a front-end or back-end of the virtual machine and setting a timer for timing data buffering time; determining, after receiving the data packets from the front-end or the back-end, whether the received data packets are interacting data packets and determining whether to enable or postpone the timer, and buffering the received data packets by the buffer and enabling the timer in the case that the data packets are not the interacting data packets; and sending the buffered data packets through a virtual machine manager to the back-end or the front-end of the virtual machine for processing in the case that the buffer reaches a maximum capacity limit or the timer reaches a predetermined time.

13 Claims, 6 Drawing Sheets

INTERRUPT PROCESSING METHOD AND SYSTEM

BACKGROUND OF THE INVENTION

1. Field of Invention

The present invention relates to the computer field, more particularly, to an interrupt processing method and an interrupt processing system.

2. Description of Prior Art

Currently, front-end and back-end drivers of virtual machines are common architectures for virtual machine shared devices. Taking a network card as an example, in most applications, a plurality of virtual machines need to share a network. Different from a case of a graphic card, the virtual machines, even in the background, use the network. Thus, a general way is to share the network card by way of the front-end and back-end drivers.

In comparison to a Native system (a local system running on a local machine) driver, a front-end or back-end (FE/BE) of a virtual machine mainly differs in that a process of calling a VMCall to exchange data through a shared data region of a virtual machine manager (VMM) is increased. However, the VMCall highly consumes running time of a CPU (one VMCall needs to consume more than two thousand clock cycles, whereas a common instruction only needs one or several clock cycles), since it involves a CPU running level and context switching, switching of registers and memory and the like, and thereby it has a great influence on the performance of the whole system.

Therefore, in addition to traditional means for optimizing device drivers (such as, changing an interrupt into a polling, changing a linked list into an array/space for time, code logical optimization, etc.), the main means to optimize the front-end and back-end of the virtual machine is to decrease the calling of VMCall.

As shown in FIG. 1, a present solution 1 is illustrated. According to this solution, in a current virtual machine system, a Native device generates an interrupt after receiving data. Then, the virtual machine intercepts the interrupt and sets a flag bit in a virtual CPU, and subsequently waits for a GOS (Guest OS, referring to a client system running on the virtual machine) to get into the virtual machine to check the status of the interrupt flag bit, so as to write a corresponding value into an interrupt-related register of the virtual CPU. The virtual CPU generates a simulated hardware interrupt, and after receiving the interrupt, the GOS will call the interrupt processing function according to a query of an IDT table.

A flowchart of a communication between the front-end driver and the back-end driver is shown in FIG. 2, which comprises:

step S202, wherein the virtual machine receives data from applications, and at the same time probably carries out necessary data check or extraction (optional);

step S204, wherein a VMCall instruction is called, the VMM is switched to, and the data are copied into a shared region;

step S206, wherein the VMM instructs the back-end to read data from the shared region by way of interrupt injecting or interface calling; and step S208, wherein the back-end driver obtains data from the shared region, and sends the data through a real device driver.

A disadvantage of this solution lies in that: this process has to be experienced once an interrupt arrives, and the GOS performance will significantly decrease when a great deal of interrupts have been generated.

According to a present solution 2, there are few devices with a function to close their interrupts, and drivers thereof may continuously read data by closing the interrupts, and then open the interrupts when there is no available data.

A disadvantage of this solution lies in that: devices require a function to close their interrupts, but currently there are few devices with such function.

SUMMARY OF THE INVENTION

In view of one or more problems described above, the present invention provides an interrupt processing method and an interrupt processing system, which utilize a dynamic buffer technology to take account of real-time performance by decreasing an additional delay caused by buffering, while decreasing calling of a VMCall, so as to achieve a balance between throughout and delay.

The interrupt processing method, according to the present invention, comprises the following steps: step one, wherein in a virtual machine, a buffer for buffering data packets received by a front-end or back-end of the virtual machine and a timer for timing data buffering time are set; step two, wherein the buffer, after receiving the data packets from the front-end or the back-end, determines whether the received data packets are interacting data packets and determines whether to enable or postpone the timer, and the buffer buffers the received data packets and enables the timer in the case that the data packets are not the interacting data packets; and step three, wherein the buffered data packets are sent through a virtual machine manager (VMM) to the back-end or the front-end of the virtual machine for processing in the case that the buffer reaches a maximum capacity limit or the timer reaches a predetermined time.

Preferably, in the case that the data packets are the interacting data packets, the buffer will not buffer the data packets, and instead, directly send the data packets to the front-end or the back-end through the VMM.

The interrupt processing system according to the present invention comprises: at least one virtual machine comprising a front-end and a back-end, for interacting with a front-end user and a back-end operating system, respectively; a data buffering controller, for buffering data packets from the front-end or the back-end in a buffer for which is individually applied in the case that the data packets are not interacting data packets, and for sending the data packets buffered in the buffer to the front-end or the back-end through a VMM in the case that the buffer reaches a predetermined capacity limit or a timer for timing data packet buffering time reaches a predetermined time; and the VMM for managing the at least one virtual machine, and forwarding the buffered data packets.

Preferably, the data buffering controller comprises: a data packet determining unit for determining whether the data packets from the front-end or the back-end are the interacting data packets; a buffering control unit for instructing the VMM to send the data packets in the buffer to the front-end or the back-end in the case that the data packets are the interacting data packets, and for buffering the data packets in the buffer in the case that the data packets are not the interacting data packets and sending the data packets buffered in the buffer to the front-end or the back-end through the VMM in the case that the data in the buffer reaches the predetermined capacity limit or the timer reaches the predetermined time; and the timer for timing the data packet buffering time, and informing the buffering control unit of reaching the predetermined time.

Preferably, the buffer may comprise a receiving buffer and a sending buffer. The buffer may be a static buffer, or may be a dynamic buffer.

In the present invention, the virtual machine, depending on its characteristics, may control hardware characteristics of physical devices based on rules, and a goal of high efficiency data transmission is achieved by shielding the interrupts of the devices and changing them into polling. For current virtual machine architectures, this scheme introduces a significant performance improvement.

BRIEF DESCRIPTION OF THE DRAWINGS

Attached drawings illustrated herein are intended to provide a further understanding for the present invention, which constitute a part of the present application. Exemplary embodiments of the present invention and the description therefor are intended to explain the present invention, and not to limit the present invention. In the drawings.

DETAILED DESCRIPTION OF PREFERRED EMBODIMENTS

In the following, particular embodiments of the present invention will be described in great detail with reference to the attached drawings.

The core idea of the present invention is to utilize a dynamic buffer technology to take account of real-time performance by decreasing an additional delay caused by buffering, while decreasing calling of a VMCall, so as to achieve a balance between throughout and delay.

Figure 1:
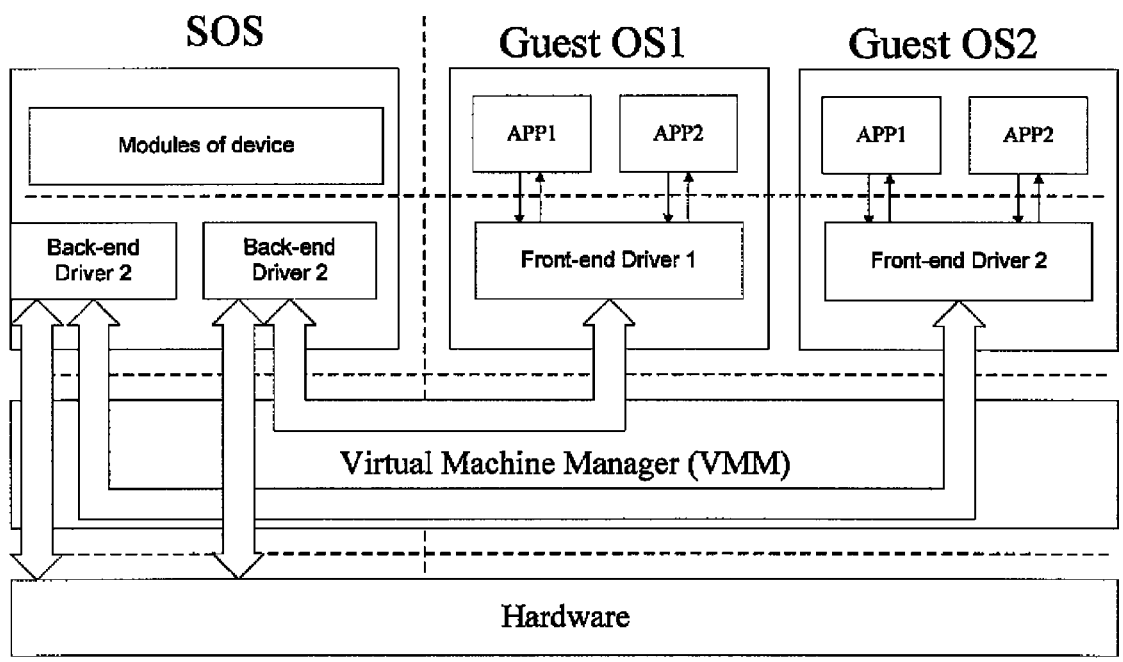
FIG. 1 is a schematic diagram showing a drive architecture for a front-end and back-end of a virtual machine according to the prior art.
Figure 2:
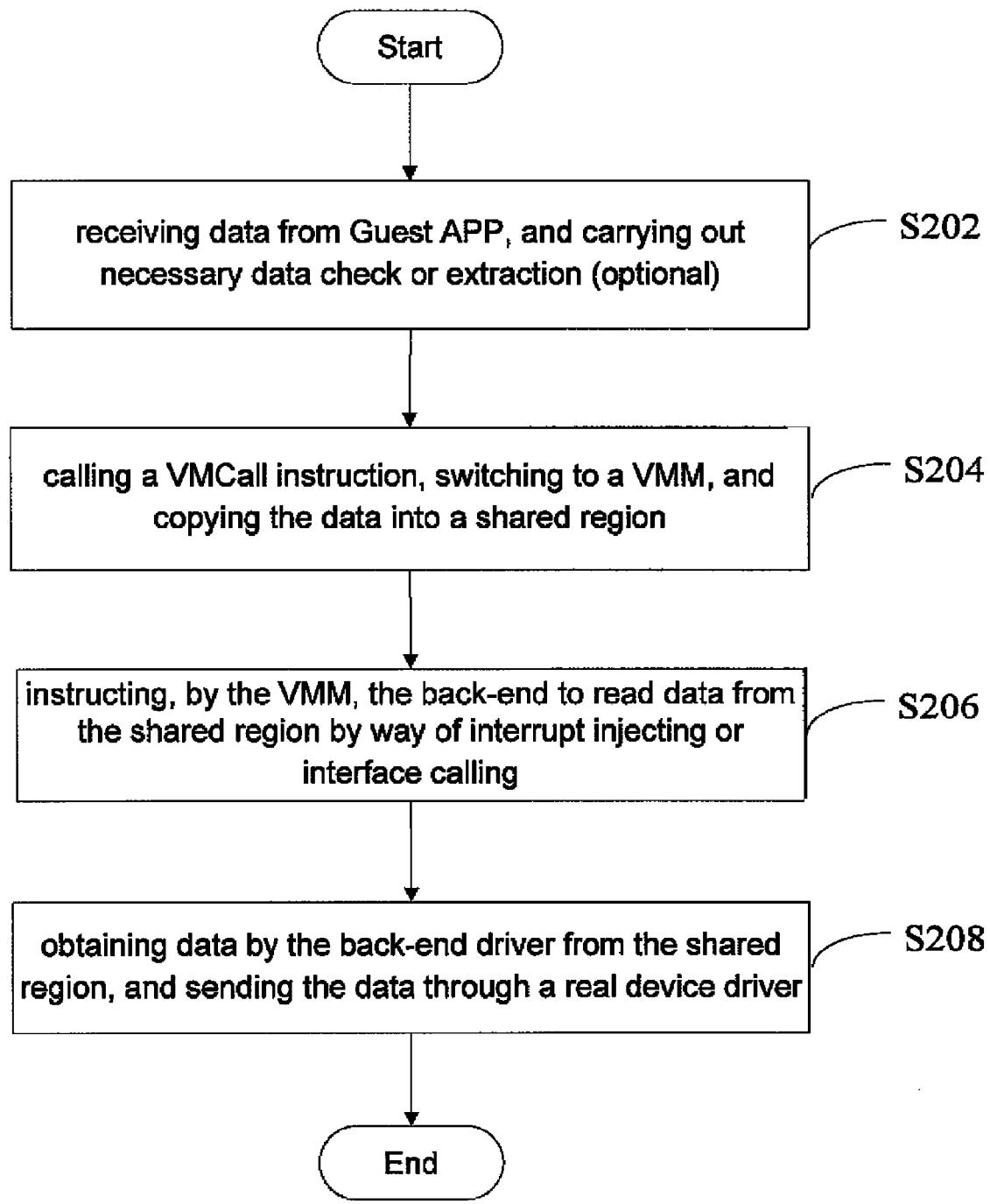
FIG. 2 is a schematic diagram showing a communication process between the front-end and the back-end according to the prior art.
Figure 3A:
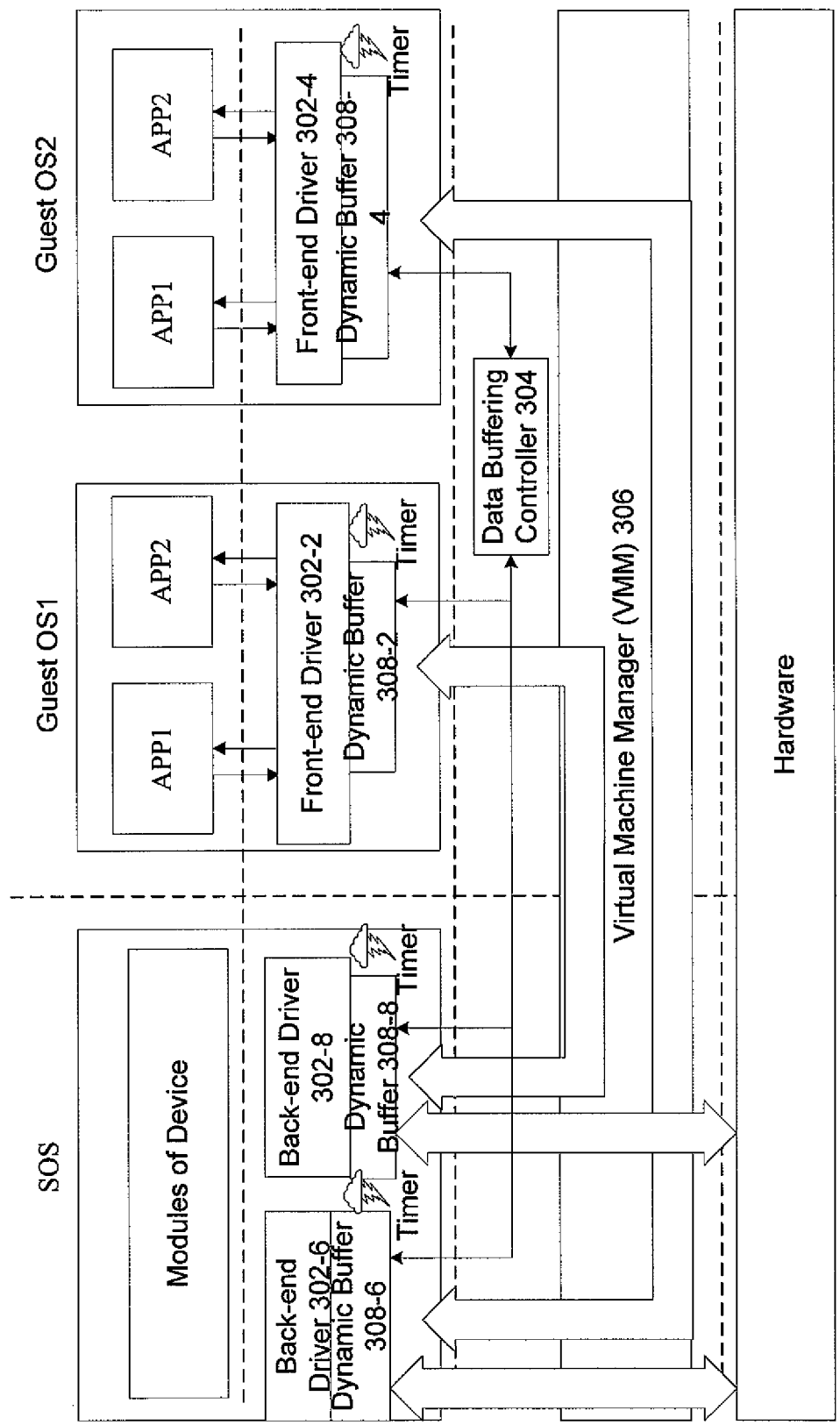
FIGS. 3A and 3B are schematic diagrams showing an interrupt processing system according to the present invention.
Figure 3B:
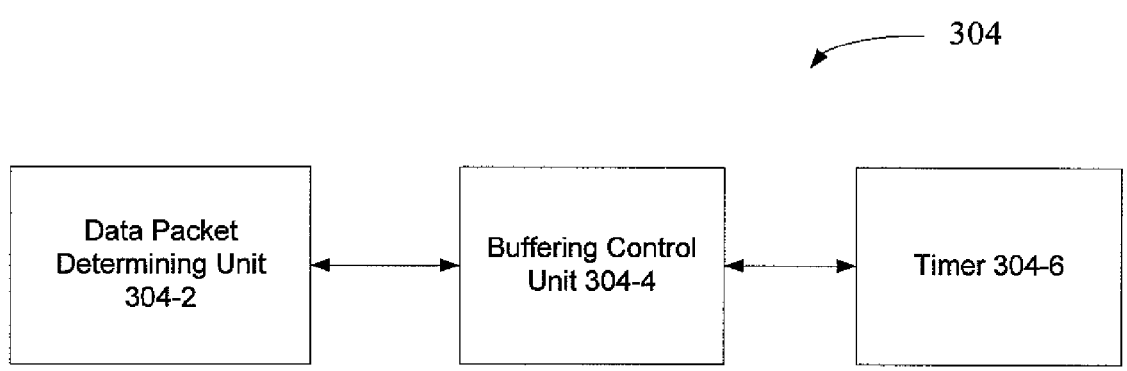

FIG. 3 is a block diagram showing an interrupt processing system according to the present invention. As shown in FIG. 3, one or more data buffers and one or more timers are added in a virtual machine, to buffer data from a front-end (FE) or a back-end (BE). The respective buffers determine, after receiving the data from the front-end or the back-end, whether the data is an interacting data packet, so as to decide whether to open respective control switches of the respective timers. If the data is not an interacting data packet, the VMcall is not called immediately. Instead, the current processing is buffered and a notice that a further processing is possible is made. Meanwhile, one timer is enabled or the time of the timer is postponed. When the data is an interacting data packet, a default manner rather than the buffer is used. The VMCall is called to send the data to the back-end or the front-end until the buffer reaches a maximum limit or the timer expires.

The interrupt processing system according to the present invention comprises: at least one virtual machine 302, comprising front-end(s) (302-2 and 302-4) and back-end(s) (302-6 and 302-8), for interacting with front-end user(s) and back-end operating system(s), respectively; a data buffering controller 304, for buffering data packets from the front-end(s) or the back-end(s) in buffer(s) (308-2, 308-4, 308-6, 308-8) for which is individually applied in the case that the data packets are not interacting data packets, and for sending the data packets buffered in the buffer(s) to the front-end(s) or the back-end(s) through a virtual machine manager (VMM) if the buffer(s) reaches a predetermined capacity limit or timer(s) for timing the data packet buffering time reaches a predetermined time; and the virtual machine manager 306 for managing the at least one virtual machine and for forwarding the buffered data packets.

The data buffering controller 304 comprises: a data packet determining unit 304-2, for determining whether the data packets from the front-ends or the back-ends are the interacting data packets; a buffering control unit 304-4, for instructing the virtual machine manager to send the data packets in the buffers to the front-ends or the back-ends in the case that the data packets are the interacting data packets, and for buffering the data packets in the buffers in the case that the data packets are not the interacting data packets and sending the data packets buffered in the buffers to the front-ends or the back-ends through the virtual machine manager in the case that the data in the buffers reaches the predetermined capacity limit or the timers reach the predetermined time; and a timer 304-6, for timing the data packet time, and for informing the buffering control unit of reaching the predetermined time.

In the system, the buffers may comprise a receiving buffer and a sending buffer respectively. The buffers may be a static buffer, or may be a dynamic buffer.

The buffers may be implemented in a variety of ways.

1. When mass data is on transmission, a queue of data packets takes at most ten data packets as a unit, and a usual handshake signal is transmitted in one data packet. Generally, an interrupt signal will be sent immediately after a data packet is received or sent. However, the implementation of the present invention is to count the data packets so as to send an interrupt when reaching a specific value, thereby reducing interrupts and improving speed. For the handshake signal in a single data packet, it is required to generate an interrupt immediately. This case may be controlled by a timer. Specifically, after a first data packet is received, an interrupt is generated immediately if a second data packet has not been received until the timer expires, thereby ensuring the real time of such single interacting data packet.

2. By manually applying for a segment of memory as a buffer (two buffers may be applied for respectively for receiving and sending data packets, or one buffer may be shared), the received or sent data packets are buffered in this buffer in a manner of copying or DMA. Because of the characteristics of the network data packets, when mass data is on transmission, one data packet will contain a plurality of data packets (<=10). The data packets are sent or received after being accumulated to a certain amount, or an interrupt is generated immediately when the received or sent data packet contains one data packet (which means that the traffic is small or the data packet is an interacting data packet).

Figure 4:
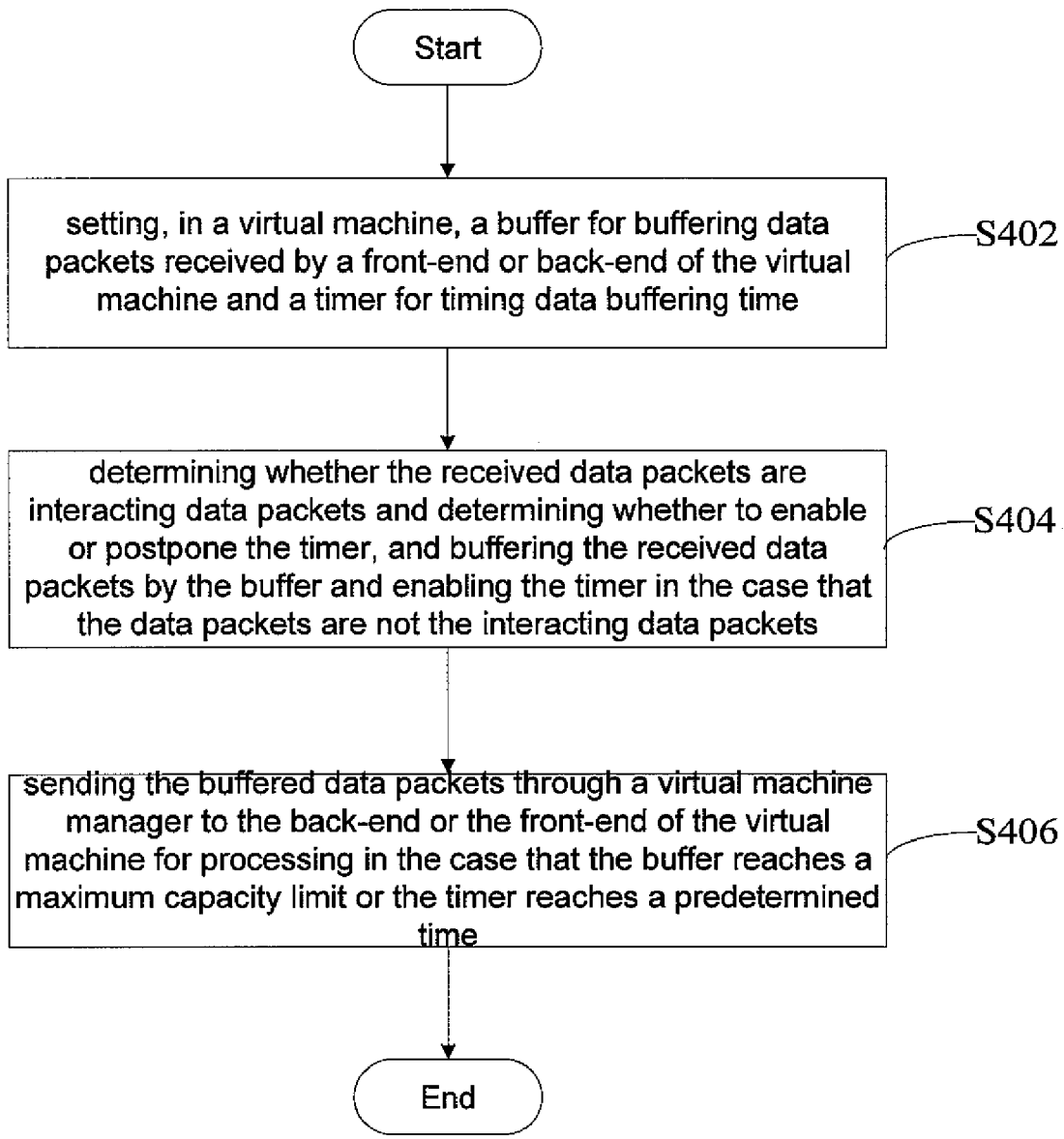
FIG. 4 is a flow chart showing an interrupt processing method according to the present invention.

FIG. 4 is a flow chart showing an interrupt processing method according to the present invention. As shown in FIG. 4, the interrupt processing method according to the present invention comprises: step S402, wherein a buffer for buffering the data packets received by the front-end or back-end of the virtual machine and a timer for timing the data buffering time are set in the virtual machine; step S404, wherein the buffer, after receiving the data packets from the front-end or the back-end, determines whether the received data packets are the interacting data packets and determines whether to enable or postpone the timer, and the buffer buffers the received data packets and enables the timer in the case that the data packets are not the interacting data packets; and step S406, wherein the buffered data packets are sent through the virtual machine manager to the back-end or the front-end of the virtual machine for processing in the case that the buffer reaches the maximum capacity limit or the timer reaches the predetermined time.

In the case that the data packets are the interacting data packets, the buffer will not buffer the data packets. Instead, the data packets are directly sent to the front-end or the back-end through the virtual machine manager.

With the above method, it is possible to efficiently decrease the number of calling of the VMCall because the timer can be continuously postponed and thus the buffer can reach its upper limit when the data amount is great; and not to bring too much delay because the timer will expire and thus there is little data buffered in the buffer when the data amount is small.

Figure 5:
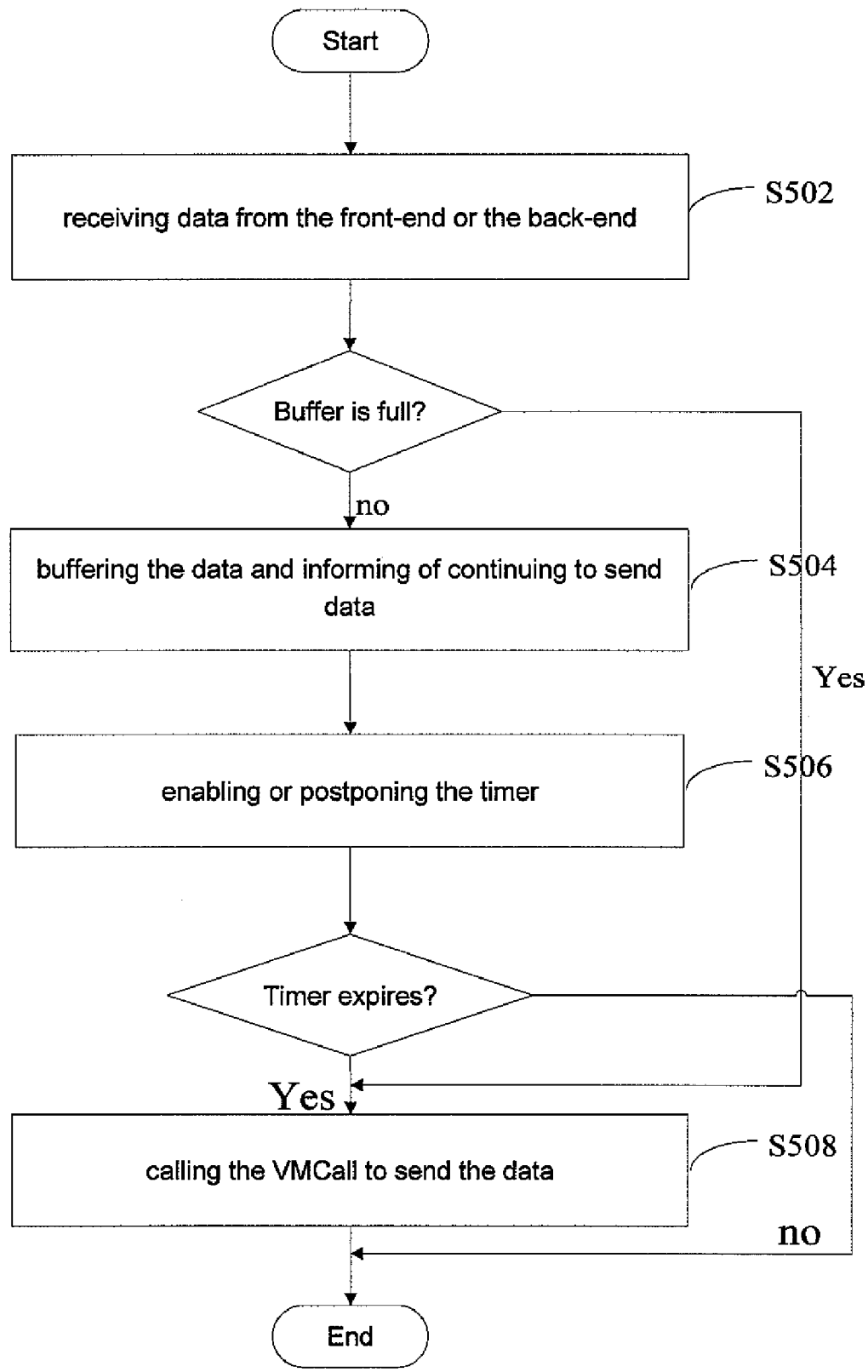
FIG. 5 is a flow chart showing a data transmission process according to the present invention.

FIG. 5 is a flow chart showing a data transmission process according to the present invention. As shown in FIG. 5, the process comprises the following steps:

step S502 of receiving data by the buffer from the front-end or the back-end;

step S504 of determining whether the buffer has been full, and calling the VMCall and sending the data to the front-end or the back-end in the case that the buffer is full;

step S506 of continuing to buffer the data and informing of continuing to send data in the case that the buffer has not been full;

step S508 of enabling or postponing the timer;

step S510 of determining whether the timer expires or not, and ending in the case that the timer has not expired;

step S520 of calling the VMCall and sending the data in the case that the timer expires.

The key of the present invention lies in buffering the received or sent data packets by the buffer during the receiving or sending process. The main purpose is to accumulate the data packets to a certain number and then to send or receive them, so as to reduce the occurrence number of interrupts. During the normal receiving or sending process, the sending or receiving of one group of data packets will cause one interrupt, and the interrupt of a network card is very frequent. The key point is to reduce the number of interrupts through the buffer.

The advantages of the present invention lie in that: the virtual machine, depending on its characteristics, may control hardware characteristics of physical devices based on rules, and a goal of high efficiency data transmission is achieved by shielding the interrupts of the devices and changing them into polling. The experimental results show that the performance improvement introduced by this scheme is significant for the current virtual machine architectures.

The above are only preferred embodiments of the present invention and are not intended to limit the present invention. For those skilled in the art, there may be various alternations and modifications in the present invention. Any modifications, substitutions or improvements made within the spirit and principle of the present invention should fall into the protection scope of the present invention.

What is claimed is:

1. An interrupt processing method, comprising the following steps:

in a virtual machine, setting a buffer for buffering data packets received by a front-end or back-end of the virtual machine and setting a timer for timing data buffering time;

after receiving the data packets from the front-end or the back-end, determining whether the received data packets are interacting data packets and determining whether to enable or postpone the timer, wherein the buffer buffers the received data packets and enables the timer in the case that the data packets are not the interacting data packets; and sending the buffered data packets through a virtual machine manager to the back-end or the front-end of the virtual machine for processing in the case that the buffer reaches a maximum capacity limit or the timer reaches a predetermined time, wherein in the case that the data packets are the interacting data packets, the buffer will not buffer the data packets, and instead, directly sends the data packets to the front-end or the back-end through the virtual machine manager.

2. The interrupt processing method according to claim 1, wherein the buffer comprises a receiving buffer and a sending buffer.

3. The interrupt processing method according to claim 1, wherein the buffer is a static buffer.

4. The interrupt processing method according to claim 1, wherein the buffer is a dynamic buffer.

5. A computer device, comprising:

a buffer configured to buffer data packets therein;

a timer configured to count a data packet buffering time;

at least one virtual machine configured to run on the computer device, comprising a front-end and a back-end configured to interact with a front-end user and a back-end operating system, respectively;

a virtual machine manager configured to run on the computer device; and a data buffering controller configured to run on the computer device to:

determine whether data packets from the front-end or the back-end are the interacting data packets;

instruct the virtual machine manager to send the data packets to the back-end or the front-end in the case that the data packets are the interacting data packets, and buffer the data packets in the buffer in the case that the data packets are not interacting data packets, and send the data packets buffered in the buffer to the front-end or the back-end through the virtual machine manager in the case that the buffer reaches a predetermined capacity limit or a timer for the timer reaches a predetermined time, wherein the virtual machine manager is configured to manage the at least one virtual machine and forward the buffered data packets.

6. The computer device according to claim 5, wherein the timer is configured to inform the buffering controller of reaching the predetermined time.

7. The computer device according to claim 5, wherein the buffer comprises a receiving buffer and a sending buffer.

8. The computer device according to claim 5, wherein the buffer is a static buffer.

9. The computer device according to claim 5, wherein the buffer is a dynamic buffer.

10. The computer device according to claim 5, wherein the buffer is a static buffer.

11. The computer device according to claim 7, wherein the buffer is a static buffer.

12. The computer device according to claim 5, wherein the buffer is a dynamic buffer.

13. The computer device according to claim 7, wherein the buffer is a dynamic buffer.

* * * * *